3,281,109
DRIVER'S WRITING BOARD
Peter A. Levandowski, Whitestone, N.Y.
(9 Highland Ave., Derry, N.H.)
Filed Oct. 26, 1964, Ser. No. 406,609
1 Claim. (Cl. 248—441)

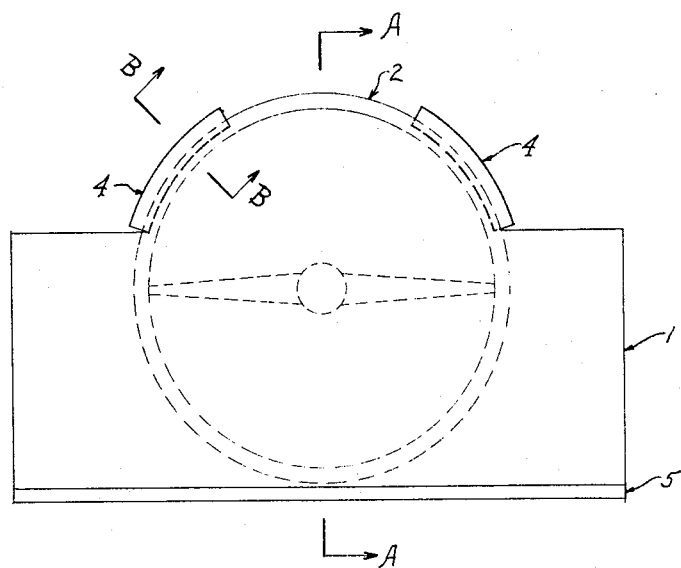
Fig. 1
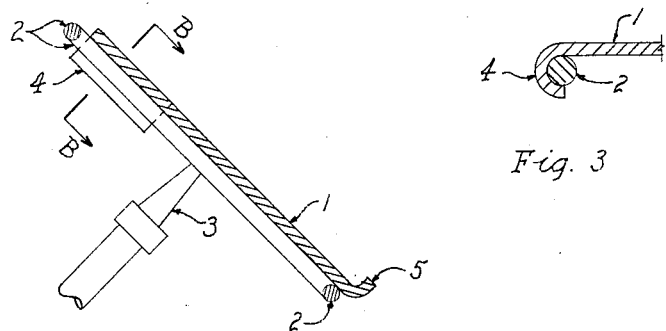
Fig. 2
Fig. 3
INVENTOR.
BY Peter Levandowski

# United States Patent Office 3,281,109
Patented Oct. 25, 1966

This invention relates to a portable writing board adapted for use with present day motor vehicles and similar conveyances.

The primary object of the invention is to provide a device of this character so constructed that it can be easily and quickly attached to the steering wheel of an automobile, and readily removed therefrom when not in use.

Travelling salesmen using automobiles will recognize the invention of this application as a unique, economical and effective appurtenance for temporary use susceptible of fulfilling the requirements of a writing desk, designed to facilitate reading, writing, drawing and the like.

Briefly stated, the idea is carried into actual practice by utilizing present day materials and fabrication methods. The board may be made of plastic or composition material and may be formed in one piece by present day methods.

Three views of said invention are shown in the drawings:

FIGURE 1 is a top plan view of the invention in its operative position on the steering wheel.

FIGURE 2 is a wide view section as cut along line A—A in FIGURE 1 and looking in the direction of arrow heads.

FIGURE 3 is a sectional view thru curved section of the board as cut along line B—B in top plan, FIGURE 1.

The numeral 1 designates the flat or writing portion of the board.

The numerals 2 and 3 represent the steering wheel and supports respectively.

The numeral 4 represents the curved portion of the board. It wraps around one-half the circumference of the steering wheel rim.

The numeral 5 designates the ledge at the bottom of the board that serves as a retainer to prevent pencils, books, writing pads, etc. from sliding off.

The invention is easily installed in position for use by simply placing writing board on top of steering wheel such that the top of the board is even with the steering wheel rim and letting the board slide down the wheel rim until the curve portion, numeral 4, firmly engages the rim thereby holding the writing board firmly in position for use.

From the foregoing description it will be seen that I have provided a writing board which can be easily and economically made and which can be quickly mounted on the steering wheel in position ready for use.

Having thus described the invention, I claim:

A portable writing board adapted to be readily attached to and removed from a vehicle steering wheel comprising: a board formed from a unitary piece of moldable material, said board having a circular top edge conforming to the rim of said steering wheel, parts of said top edge being bent back upon themselves to provide semicircular rim engaging means, said board having a transversely extending lower edge which is bent away upwardly from the board to provide a writing instrument ledge.

References Cited by the Examiner
UNITED STATES PATENTS
1,717,433  6/1929  Bragg et al. _____ 248—441
1,883,714  10/1932  Gray _____ 312—233

EUGENE R. CAPOZIO, Primary Examiner.

S. M. BENDER, R. E. KLEIN, Assistant Examiners.